United States Patent

Shigeta et al.

[11] Patent Number: 5,309,340
[45] Date of Patent: May 3, 1994

[54] LIGHTING APPARATUS

[75] Inventors: Teruaki Shigeta, Neyagawa; Takeshi Nishiura, Hirataka, both of Japan

[73] Assignee: Matsushita Electric Industrial Co., Ltd., Kadoma, Japan

[21] Appl. No.: 978,255

[22] Filed: Nov. 18, 1992

[30] Foreign Application Priority Data

Nov. 18, 1991 [JP] Japan .................. 3-300933

[51] Int. Cl.$^5$ .............................................. F21V 7/00
[52] U.S. Cl. ....................................... 362/299; 362/300
[58] Field of Search ............. 362/298, 299, 300, 301

[56] References Cited

U.S. PATENT DOCUMENTS

| | | | |
|---|---|---|---|
| 3,241,440 | 3/1966 | Kugler | 362/299 |
| 4,460,939 | 7/1984 | Murakami et al. | 362/300 |
| 4,771,372 | 9/1988 | Litetar et al. | 362/299 |
| 5,117,312 | 5/1992 | Dolan | 362/298 |
| 5,217,299 | 6/1993 | Yoshida et al. | 362/298 |
| 5,235,499 | 8/1993 | Bertenshaw | 362/299 |

Primary Examiner—Richard A. Bertsch
Assistant Examiner—Michael I. Kocharov
Attorney, Agent, or Firm—Ratner & Prestia

[57] ABSTRACT

There is provided a lighting apparatus comprising a light source, an ellipsoidal reflector having the first focal point at the light source, a spherical reflector having the center of sphere at the light source, a converging lens arranged at the outside of the spherical reflector and having a focal point thereof at the second focal point of the ellipsoid, and a light-controlling plate arranged in front of or at the back of the lighted object, so that the light beam projected on the part other than the effective lighted part of the lighted object is reflected by the light-controlling plate with various characteristics which are changeable such as the position or spectral distribution of the light resulting in lighting which is efficient and of uniform intensity and color on the lighted object.

14 Claims, 8 Drawing Sheets

LIGHTING APPARATUS

BACKGROUND OF THE INVENTION

1. Field of the Invention

This invention relates to a lighting apparatus which, with a light source, reflector, and lens et al. combined, projects a parallel-running light to an intended direction efficiently.

2. Prior Art

In a display device especially, the projection type liquid crystal display, which, receiving a light projected on the liquid crystal panel thereof, project to a screen the image appearing in the panel enlarging it with appropriate optical system, the lighting apparatus therefor was required to project a light beam or rays of lights running parallel all perpendicularly to the surface of each element of liquid crystal panel to conform to the characteristics of the panel.

As the lighting apparatus to obtain such object, several structures have been proposed:

One of the apparatus, as shown in FIG. 7, consists of a point light source 1 (for example, a tungsten halogen lamp, metal halide lamp or short arc type xenon lamp) and a paraboloid type reflector 3 to surround and keep at its focal point A the light source 1, the section of the reflector by a plane passing the optical axis 2 forming a parabola. A part of the light emitted by the light source is reflected by the paraboloid reflector 3 to project light beam on a liquid crystal panel 4 or the object to be lighted.

Another apparatus, as shown in FIG. 8, is a combination of a light source 1, spherical reflector 6, and a converging lens 7, and the light source 1 is placed at the coinciding focal points B of the spherical reflector 6 and the converging lens 7. A part of the light of the light source 1 is reflected by the spherical reflector 6 to pass again the focal point B, and, with the other light from the source, proceeds to the converging lens 7, to project light beam on the liquid crystal panel 4 (Publication of Japanese Patent Application No. Sho 59-42404).

The third apparatus is constructed by a light source 1, a ellipsoidal reflector 9, and a converging lens 10, so arranged that the light source 1 is placed at one focal point C of the ellipsoidal reflector 9 and the converging lens has its focal point at the second focal point D of the ellipsoid. With this structure, most of the light of the light source 1 is reflected by the ellipsoidal reflector 9 to converge at the second focal point D, to proceed to the converging lens 10, and to be projected on the liquid crystal panel 4 as a light beam (Publication of Japanese Patent Application, No. Hei 1-25046).

Any of the above apparatus arrange the light source at the focal point of a reflector of conicoid, and a part of the light of the source is reflected by the reflector to proceed to the liquid crystal panel directly or through a converging lens, performing efficient use of light.

In the projection type liquid crystal display, a liquid crystal panel of rectangle or square of about 3 diagonal is used at the moment. To light whole surface of the liquid panel efficiently, it is, of course, necessary for the light beam to have section at least the same with or larger than the liquid crystal panel.

Efficient projection of light on the liquid crystal panel is obtained by making the section of the light beam to be the same as the shape of the panel (Japanese Patent Application Laid-Open, No. Hei 4-7503). However, the complicated structure of the reflector is not practical. And, in the lighting apparatus in practical use for the projection type liquid crystal image display the light beam 14 projecting to the panel 13, through ellipsoidal reflector 12 is of circular or approximately circular section, (as shown by the two-dot dash line in FIG. 11) as a result of the performance of the constructing optical elements.

The liquid crystal panel 13 is, as described above, rectangular or square and it is arranged so as the panel is perpendicular to the optical axis 14 of the beam from the reflector 12 and is inscribed to the circular section of the beam.

For the efficient lighting of the liquid crystal panel, as is shown in FIG. 10 and FIG. 11, it is noted that the light is projected within the range of h as shown by the hatching. While the light beam is of circular section shown by H in FIG. 10 and FIG. 11, the remaining part of the light (H-h) was not used.

Also it is known, that the light emission of the metal halide lamp as used as the light source 11 consists of a line spectrum of mercury at the middle of the arc and a strong spectrum of rare earth element involved in the lamp at the outer part, so that, this color division between the center and the outer part brings the unevenness of color between the center and outer part of the liquid crystal panel, resulting in the unevenness of color on the screen.

SUMMARY OF THE INVENTION

A lighting apparatus is disclosed which, with simple structure, projects efficiently parallel rays of light onto an object.

A lighting apparatus according to an exemplary embodiment of the present invention comprises:

a reflector of partial elliptic cylinder or ellipsoid having an inside reflecting surface, a light source located at the first focal point of the reflector to cause the light from the light source to focus at the second focal point thereof, a reflector of partial sphere facing the reflector of elliptic cylinder or ellipsoid and having the center of the sphere located at the light source, and provided with an aperture at the second focal point around the optical axis a converging lens arranged at the outside of the reflector of the partial sphere and having a focal point thereof at the second focal point of the reflector of elliptic cylinder, and a light-controlling plate arranged at the further outside of the converging lens.

The light-controlling plate may be a flat mirror having an opening around the axis of the elliptic cylinder.

The light-controlling plate may be a semitransparent and semi-reflective flat plate arranged at the front or back of the lighted object, a liquid crystal panel for example, having the transmittance and reflectivity vary along the radius direction from the axis.

The light-controlling plate may have a transmittance and reflectance which are spectrally selective.

Further, the light-controlling plate consisting of a partially or completely reflective flat plate is placed behind the liquid crystal panel or before the light-outgoing surface, and the amount of light reflected by the light-controlling plate is adjusted by the control of the transmittance of the part of the panel corresponding to the completely reflective flat plate.

In the lighting apparatus according to the present invention, the light emitted to all the direction is converged by the ellipsoidal reflector and spherical reflector to proceed to the converging lens.

Out of the light beam projected by the converging lens, the part incident outside of the efficient lighted area of the liquid crystal panel is reflected by the light-controlling plate to be returned to the light source and the ellipsoidal reflector and projected, again through the converging lens, on the liquid crystal panel, resulting in the efficient use of energy.

Also, with the flat semitransparent light-controlling plate which, with transmittance and reflectance varying between the center and outer part, the amount of light projected on the part of the liquid crystal panel other than the effective lighted area and reflected by the light-controlling plate, and the amount of light of beam which is projected, after returning to the light source and the ellipsoidal reflector, again through the converging lens may be adjusted, so that the unevenness of light distribution on the panel is controlled and reduced at will.

Further, with the light-controlling plate which is flat and transparent and has spectrally selective transmittance and spectrally selective reflectance, the spectral distribution of the light beam projected on the part of the liquid crystal panel other than the effective lighted area and reflected by the light-controlling plate is controlled by the characteristics of the light-controlling plate, resulting in the adjustment of the spectral distribution of light projected, after returning to the light source and ellipsoidal reflector, on the liquid crystal panel via the converging lens again. Thus, by the control of the spectral distribution, the unevenness of light beam projected on the liquid crystal panel is controlled and reduced at will.

Furthermore, with the light-controlling plate which is flat and either partially or completely reflective and placed at the back side of the liquid crystal panel, that is, the side of the surface of the panel from which the light originally projected by the source goes out after passing through, and by changing the transmittance of the part of the panel, which part corresponds to the completely reflective mirror, the part of the light beam which is projected by the converging lens is reflected by the light-controlling plate through the panel, is returned to the light source and the ellipsoidal reflector, and is projected again on the panel via the converging lens, is adjusted, so that the amount and the intensity distribution of the light beam projected on the effective area of the panel is controlled and the unevenness is reduced.

DETAILED DESCRIPTION OF THE INVENTION

Figure 1:
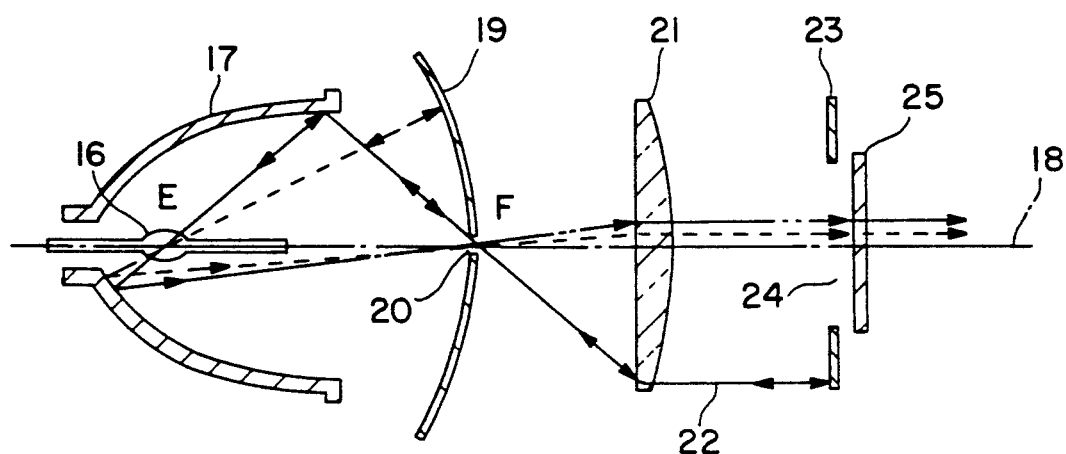
FIG. 1 is a sectional view of a lighting apparatus according to a first exemplary embodiment of the present invention.

Now, referring to the drawings, the first exemplary embodiment of the present invention is explained as follows.

Figure 2:
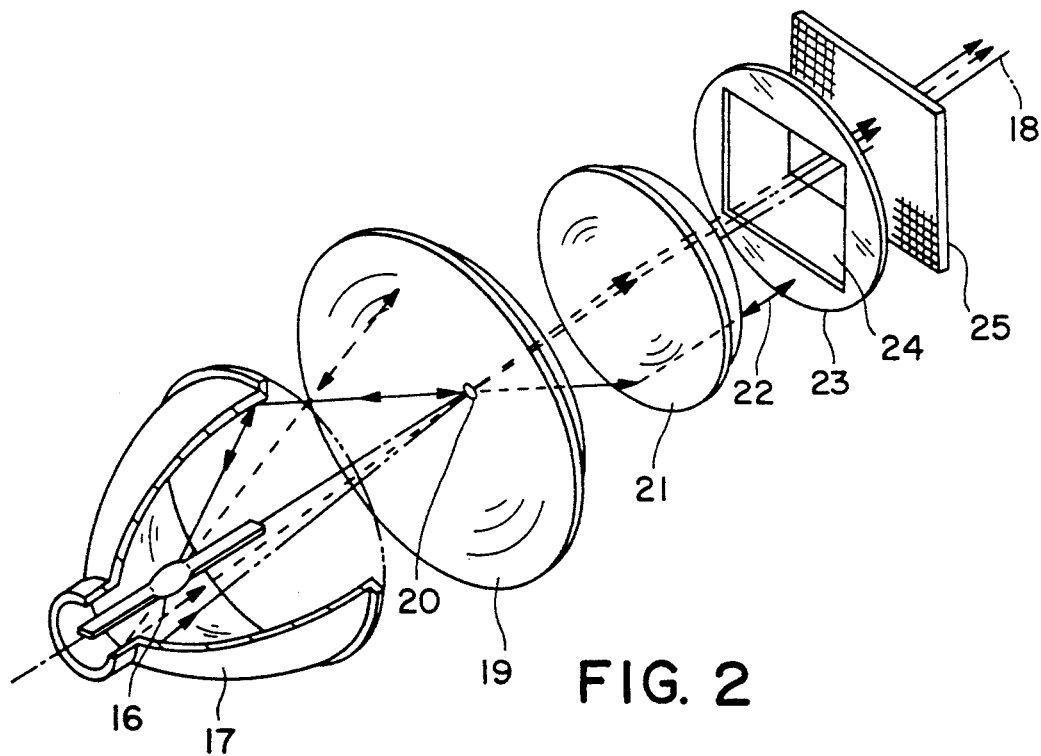
FIG. 2 is a perspective view of a lighting apparatus according to a first exemplary embodiment of the present invention.

FIG. 1 is a sectional view showing the general structure of a lighting apparatus according to the present invention, and FIG. 2 is a perspective view showing a partial section of the apparatus. The lighting apparatus has a light source 16 of a metal halide lamp whose light-emitting-part is of small globe-like shape;

an ellipsoid reflector 17 which has inside mirror surrounding and has its first focus at the light source 16 thus determining an optical axis 18;

a spherical reflector 19 arranged at the second focus F of the ellipsoid reflector 17 and having the center of the sphere at the first focus E of the ellipsoid reflector 17 but having a circular aperture 20 in the vicinity of the axis;

a converging lens 21 which has its focus at the second focus F of the ellipsoid reflector 17 to produce parallel running light beam 22;

a light-controlling plate 23, which consists of complete reflecting mirror for controlling the light distribution pattern of the beam 22 and is arranged at the outside of the converging lens 21, and has a rectangular aperture 24 around the axis 18.

The light generated by the lighting apparatus is projected upon the liquid crystal panel 25.

The light emitted by the light source 16 towards the ellipsoid reflector 17 is reflected by the ellipsoid reflector 17 and converges at the second focus F of the ellipsoid. The light which runs directly to the spherical reflector 19 is reflected by the spherical reflector 19, returns to the light source 16, and is reflected again by the ellipsoid reflector 17, and runs to, and converges at the second focus F.

The light converged at the second focal point F runs through the focal point and the aperture 20 of the spherical reflector 19 towards the converging lens 21. Thus, all the light emitted to all directions by the light source 16 goes to the converging lens.

Since the converging lens 21 has its focal point at the second focal point F of the ellipsoid, which passes through the light the converging lens 21 as it proceeds toward the light-controlling plate 23, runs as parallel rays or a beam 22.

The light-controlling plate 23 is provided with a rectangular opening 24 around the axis 18, which defines the effective area of liquid crystal panel 25.

A part of the beam 22, passing through the opening 24, is projected to the liquid crystal panel 25, to visualize the image (not shown in the drawings) latent therein as a directly viewed image or a image on a screen (not shown) by the transmitted beam.

The light beam 22 projected on the area other than the rectangular opening 24 of the light-controlling plate 23 is reflected by the mirror of aluminum coating on the light-controlling plate 23 towards the converging lens 21, goes back through the second focal point F of the ellipsoidal reflector 17 and the aperture 20 of the spherical reflector 19, and ellipsoidal reflector 17, to the light source 16 or the neighbour thereof. The light returned back to the light source 16 is reflected again by the ellipsoidal reflector 17, passes through the second focal point F and the aperture 20, and, then runs parallel to axis 18 after passing through the converging lens 21 and then passes through the rectangular aperture 24 of the light-controlling plate 23, to the liquid crystal panel 25. Thus, the light beam 22 projected outside of the effective area of the liquid crystal panel 25 is transmitted to the effective area by the light-controlling plate 23.

As the result, the light emitted by the light source 16 lights the crystal liquid panel 25, without waste and causes a bright image.

The light-controlling plate 23 and the liquid crystal panel 25, arranged with a space therebetween in the above embodiment, may be close together as to leave no-space therebetween, or they may be a unitary structure i.e. the structure that the front surface of the panel 25 is covered directly by reflective substance or the reflective type liquid crystal panel. The size or the opening 24 of the light-controlling plate 23 can be varied with respect to the liquid crystal panel 25 so that the function and effect of the structure will vary.

Figure 3:
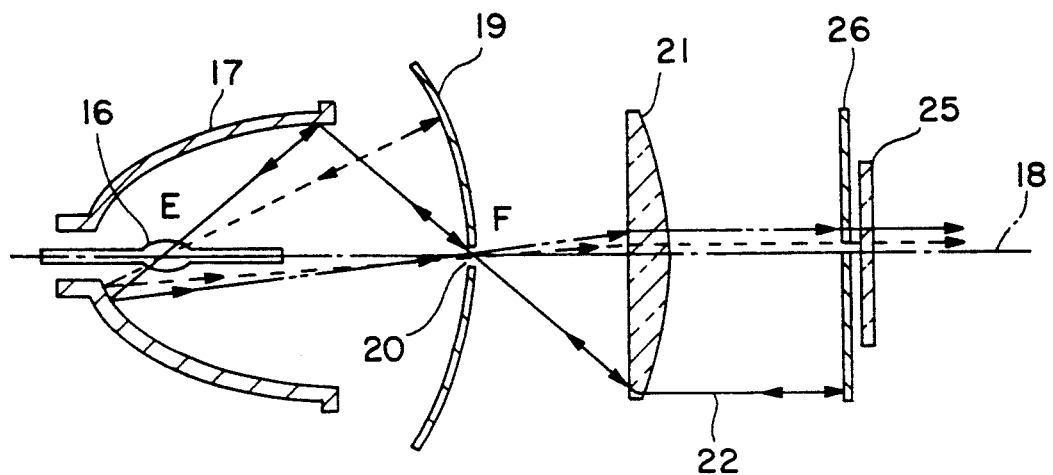
FIG. 3 is a sectional view of a lighting apparatus according to a second exemplary embodiment of the present invention.
Figure 4:
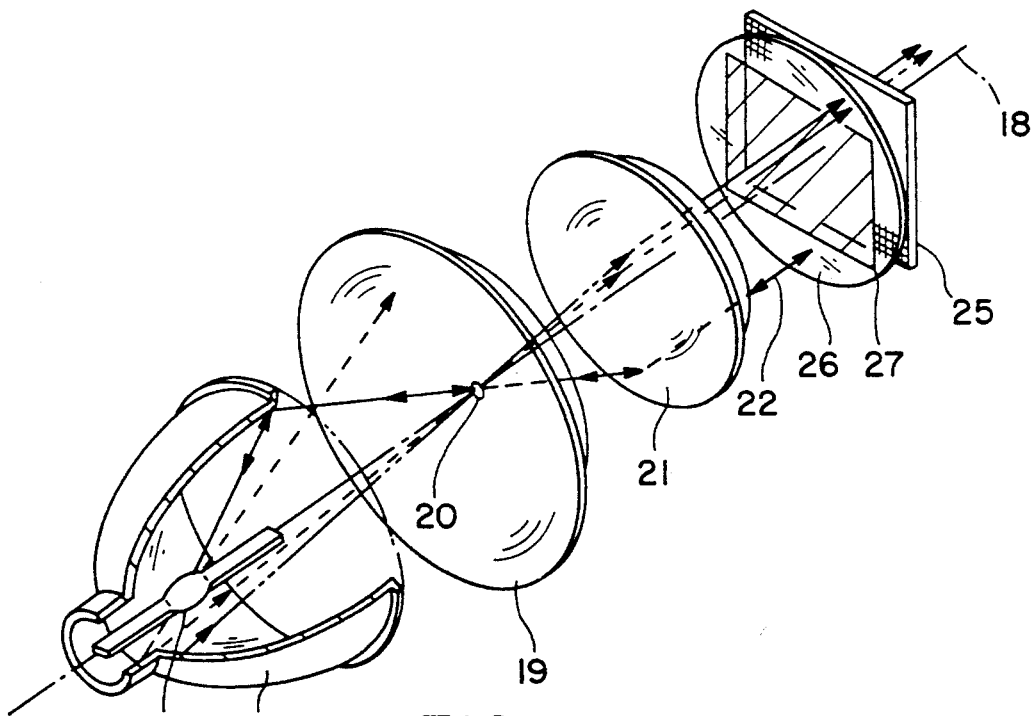
FIG. 4 is a perspective view of a lighting apparatus according to a second exemplary embodiment of the present invention.
Figure 5:
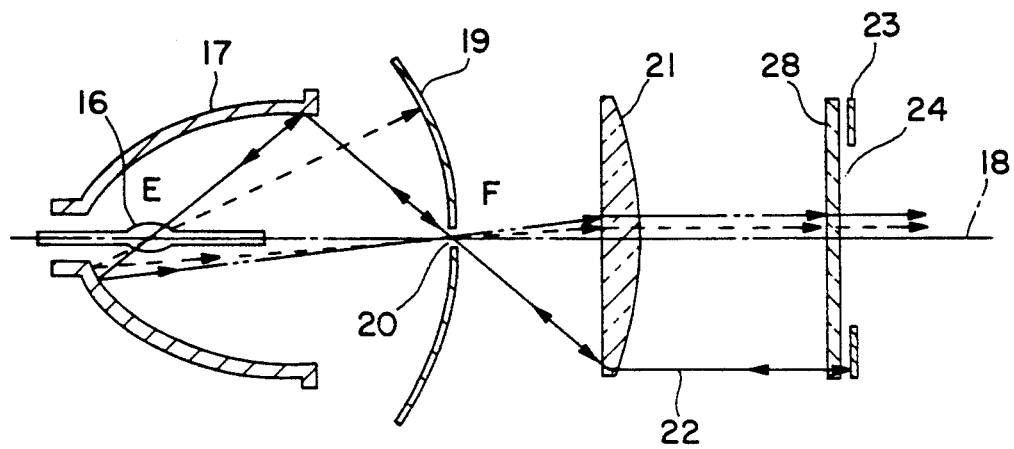
FIG. 5 is a sectional view of a lighting apparatus according to a third exemplary embodiment of the present invention.

Next, a second exemplary embodiment of the present invention is explained, referring to FIG. 3, FIG. 4, and FIG. 5. The main parts and geometrical relation thereof as well as their name in FIG. 3 and FIG. 4 are the same as those in the first embodiment, so that the explanation is omitted.

The different points in the second embodiment from the first are:

(1) That the light-controlling plate is a semi-transparent and semi-reflective flat panel with transmittance and/or reflectivity varying along the radius direction from the light axis.

(2) That the light-controlling plate is a flat plate having a spectrally selective reflectance varying by the place.

With regard to case (1) above:

According to an exemplary embodiment of the present invention, the light-controlling plate is provided with a transmittance and reflectivity partially different, and by controlling the value and distribution thereof, a uniformly distributed light is given to the object or the liquid cryustal panel.

In FIG. 3 and FIG. 4, the light-controlling plate 26 is positioned along the path of light beam 22 from the converging lens 21 and is placed just before the lighted object or the front surface of the liquid crystal panel 25 so that there is nearly 100% transmittance at the transparent area 27 (the hatched rectangle in FIG. 4) corresponding to the effective area of the liquid crystal panel 25, and is provided, at the remaining part, with a semitransparent film of vapor-deposited multi-layered metal so that the ratio of transmittance and reflectance can be changed depending on the light distribution of the light beam 22.

In FIG. 3 and FIG. 4, the light emitted by the light source 16 which passes the ellipsoidal reflector 17, is reflected by it and focuses at the second focal point F. The light going from the source 16 to the spherical reflector 19 is reflected there, and is returned to the light source 16 where it is focused by the reflector 17 at the second focal pint F. The converged light passes forward through aperture 20 of spherical reflector 19 provided around the second focal point F and through the converging lens 21. Since the converging lens 21 has its focal point at the second focal point F of the ellipsoidal reflector 19, the light projected from the lens 21 runs to the light-controlling plate 26 as parallel light or light beam 22, the same as in the first embodiment.

As the light-controlling plate 26 is provided with a transparent area corresponding to the effective area of the liquid crystal panel 25 and having nearly 100% transmittance, a part of the light beam 22 passes through the transparent area 27 of the light-controlling plate, and is projected to the liquid crystal panel 25 to visualize the image it involves.

On the other hand, the part of the light beam 22 projected onto the area of the light-controlling plate 26 other than the transparent area 27 is reflected by the semitransparent mirror which is on the light-controlling plate 26 and has the transparency and reflectance varied depending upon the intensity distribution of light beam 22.

The part of the beam 22 reflected returns via the converging lens 21, through the aperture 20 of the spherical reflector 19 at the second focal point F of the ellipsoidal reflector 17 and passes to ellipsoidal reflector 17 to the light source 16 or its proximity.

The light returned to the light source 16 is again reflected by the ellipsoidal reflector 17, passes the second focal point F and aperture 20, and, after being controlled to be parallel, is projected to the liquid crystal panel 25 through the transparent area 27 of the light-controlling plate 26.

Since the amount and distribution of the light beam 22 projected on the liquid crystal panel 25 is adjusted by varying the distribution of the ratio of transmittance and reflectance of the semitransparent mirror of the part other than the transparent area 27 of the light controlling plate 26, the unevenness of the light projected on the liquid crystal panel 25, i.e. the variation of light distribution caused by the light source 16, the ellipsoidal reflector 17, or the spherical reflector 19 is controlled and reduced at will. If a means is provided as is able to control the reflectance distribution of the semitransparent mirror picture-element by picture-element, more precise control is possible.

Thus the light emitted by the light source is projected on the liquid crystal panel 25, with a desired distribution and without loss, resulting in bright uniform image.

With regard to case (2) above:

For a projection type liquid crystal display use is often made of a metal halide lamp, which has division of color between the arc center and the outer part causing unevenness of color on the screen. The lighting apparatus according to an exemplary embodiment of the present invention is provided with a light-controlling plate having spectrally selective reflecting characteristics and can project light beam without unevenness of color to the liquid crystal panel.

Referring to FIG. 3 and FIG. 4 the light-controlling plate 26, has the transparent area 27 with 100% transmittance and a semitransparent area having transmittance and reflectance variable conforming to the amount of light of beam 22, and partially and spectrally selective transmittance and reflectance.

The lighting apparatus thus organized can, in addition to the basic function of the apparatus of case (1), adjust the spectral distribution of the light beam 22 projected on the liquid panel 25, to control and reduce at will the unevenness of color of the panel.

Further by providing means to control the distribution of spectral reflectance picture-element by picture element, the color distribution can be controlled freely and precisely.

Figure 6:
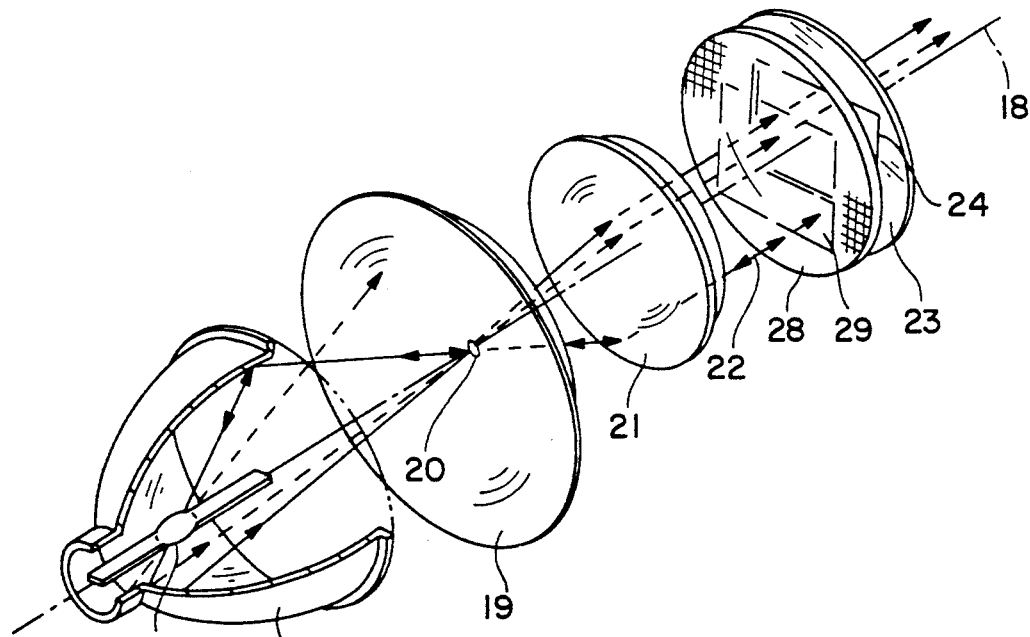
FIG. 6 is a perspective view of a lighting apparatus according to a third exemplary embodiment of the present invention.
Figure 7:
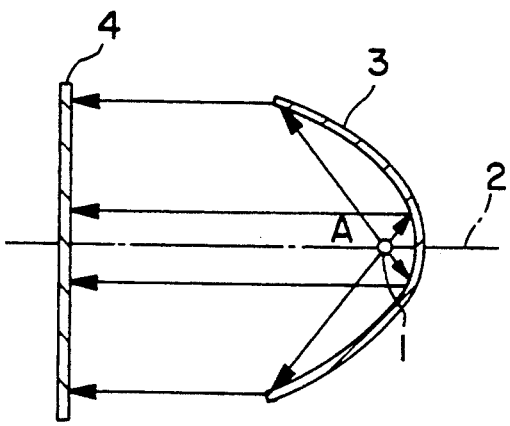
FIG. 7 is a sectional view of a conventional lighting apparatus with a paraboloid reflector.
Figure 8:
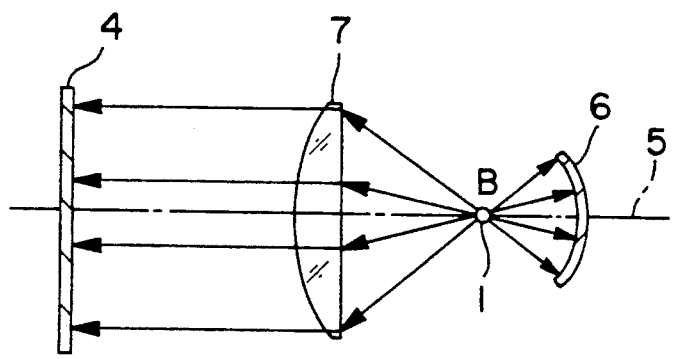
FIG. 8 is a sectional view of a conventional lighting apparatus with a spherical reflector and a converging lens.
Figure 9:
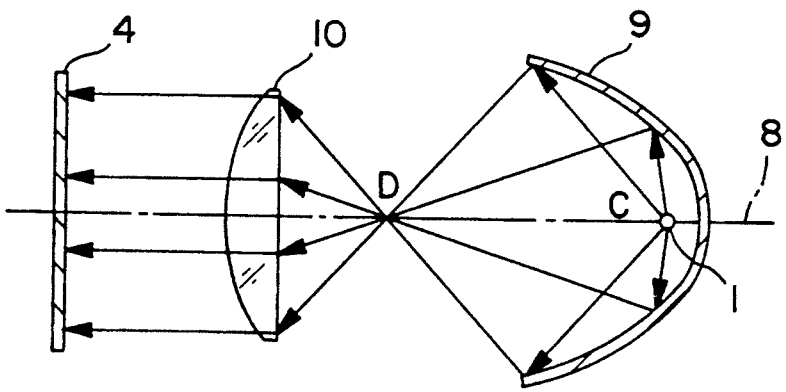
FIG. 9 is a sectional view of a conventional lighting apparatus with an ellipsoidal reflector and a converging lens.
Figure 10:
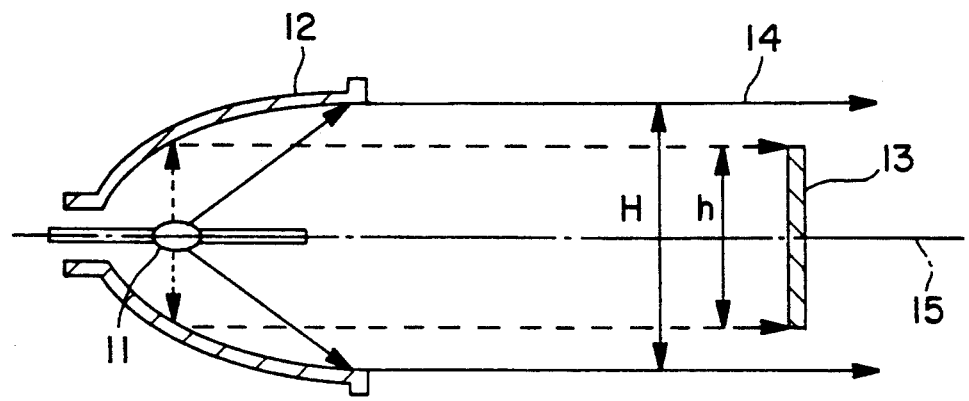
FIG. 10 is a sectional view of the conventional apparatus with a paraboloidal reflector showing the operation thereof.
Figure 11:
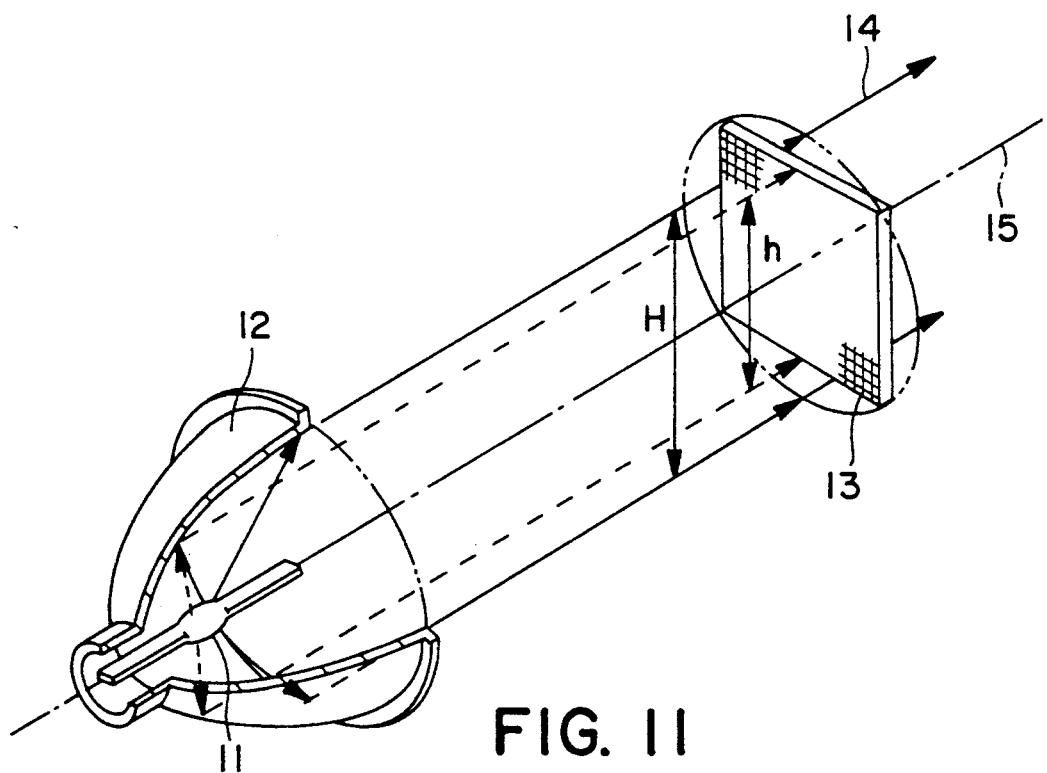
FIG. 11 is a perspective view of the conventional apparatus with a paraboloidal reflector showing the operation thereof.

Now referring to FIG. 5 and FIG. 6, a third exemplary embodiment of the invention is explained. The difference of the apparatus of the third embodiment from those of the first and second embodiments is that the light-controlling plate is behind the back side of the liquid crystal panel, i.e. the side of the panel opposite side facing the light source or the converging lens. The light-controlling plate is a completely reflective mirror with a rectangular opening. The light which forwarded to the mirror part of the light-controlling plate is reflected and is returned through the liquid crystal panel to the light source, where it is emitted again.

By controlling the transparency of the liquid crystal panel 28 corresponding to the mirror part of the light-controlling plate, the liquid crystal panel can be lighted with a uniformly distributed light beam.

In FIG. 5 and FIG. 6 the light-controlling plate 23 is placed on the main axis 18 of light and behind the liquid crystal panel and is provided with a rectangular opening 24 corresponding to the effective lighted area 29. The light-controlling plate 23 is coated with aluminum to reflect completely, similar to the coating of the first embodiment.

The light-emitted from the light-source 16 goes to the ellipsoidal reflector 17, where it is reflected and converged at the second focal point F. The light proceeding directly to the spherical reflector 19 is reflected by the spherical reflector 19 and returned to the light source 16 where it is reflected by the ellipsoidal reflector 17 and converged at the second focal point F. As the second focal point spherical reflector 19 is provided with an aperture 20, the converged light passes to the converging lens 21, which has its focal point at the second focal point F of the ellipsoid, and causes the light to run parallel as a light beam 22, as in the first and second embodiments.

Then the light beam 23 is projected onto the liquid crystal panel 28, and, passing through it, proceeds to the light-controllling plate 23. As the light-controlling plate 23 is provided with a rectangular aperture 24 around the axis 18 and corresponds to the effective lighted area 29 of the liquid crystal panel 28, the main part of the light beam 22 passes back through the aperture 24 to visualize an image (not shown in the drawings) given to the panel.

The part of the light beam 22 which passed the outer ineffective area of the liquid crystal panel 28, is reflected by the mirror of the light-controlling plate 23, and, returns, back through the liquid crystal panel 28, through aperture 20 of the spherical reflector 19 located at the second focal point F of the ellipsoidal reflector 17, and to the ellipsoidal reflector 17, to the light source 16 or its vicinity. The light returned to the light source 16, is reflected again by the ellipsoidal reflector 17, and, passes through the second focal point F and the aperture 20, where it is made parallel by the converging lens 21 and is projected, along the axis 18 this time, to the effective lighted area 29 of the liquid crystal panel 28.

By the above described operation, the part of the liquid crystal panel 28 corresponding to the light-controlling plate 23 has the reflected light passing again. Accordingly, by adjusting the transparency of the liquid crystal panel 28 portion by portion, a part of the light beam 22 projected on the liquid crystal panel 28 passes through to the rectangular aperture 24 with the remaining part of the light beam 22 being reflected by the light-controlling plate 23 and projected again on the liquid crystal panel 28, so that the distribution of the amount of light can be adjusted. Thus, the variation and unevenness in the amount of light received by the liquid crystal panel 28 is controlled and reduced at will. Further, by providing a control means to change the reflectance of the light-controlling plate 23, for example, by controlling the reflectance picture element by picture element, the uneveness of the light distribution can be adjusted more precisely.

The above described function is applied to all of the light emitted by the light source 16. The light can be projected on the liquid crystal panel 28 with any distribution desired and efficiently to obtain bright and uniform images viewed directly or by screen.

Further, instead of the light-controlling plate 23 similar to that of the first embodiment, the light-controlling plate 26 used for the second embodiment may be used i.e. the one provided with a transparent area 27 corresponding to the effective lighted area 29 of the liquid crystal panel 28 around the axis 18, and, at the outside of the transparent area, with a semitransparent mirror, the transmittance and reflectance of which is adjusted at will; in this case, so that the same function and effect achieved in the second embodiment are attained.

Further, instead of the structure having some distance between the liquid crystal panel 28 and the light-controlling plate 23 as described in the above embodiment, a structure having the liquid crystal panel and the light controlling plate close together or a structure having the reflecting means directly on the outgoing surface the liquid crystal panel 28 may be possible with the same function and effect.

Furthermore, instead of the metal halide lamp as an example of the light source 16 in the above embodiments, other light sources of small size and high brightness such as tungsten halogen lamps or short arc type xenon lamps may be utilized.

Also, the function of the light-controlling plate to return a part of the parallel light to the light source may be performed by any light guide to cause a light to return.

Thus, according to the present invention, following effects can be obtained:

(1) In addition to projecting the light emitted by a light source towards a converging lens by an ellipsoidal reflector and spherical reflector, the invention, involves arranging a flat light-controlling plate is a mirror having an aperture around a light axis along the light course between the converging lens and the liquid crystal panel to receive the light, so that the light-controlling plate reflects part of the light projected to an area other than the effective area of the liquid crystal panel to be lighted by the light beam projected from the converging lens to return to the light source and the ellipsoidal reflector and to then be projected through the converging lens again to the effect area of the liquid crystal panel to be utilized without loss.

(2) With the light-controlling plate which is a transparent flat plate having the transmittance and reflectance varying along the radius direction from around the axis to the peripheral part, the amount of the reflection of the light beam incident on the area other than the effective lighted area of the liquid crystal panel and the amount of the passed-through light which is to be projected on the liquid crystal panel after returning to the light source and the ellipsoidal reflector and after converging by the converging lens can be adjusted easily, resulting in the control at will of the amount and distribution of light on the liquid crystal panel.

(3) With the light-controlling plate of transparent flat plate having spectrally selective transmittance and spectrally selective reflectance, the spectral distribution of the part of the light beam projected upon the area other than the effective lighted area of the liquid crystal panel and the spectral distribution of the light beam which is to be projected on the liquid crystal panel after returning to the light source and the ellipsoidal reflector and after passing through the converging lens can be adjusted easily to control and reduce the unevenness of color due to the change of the spectral distribution of the light beam projected on the liquid crystal panel.

(4) Providing a light-controlling plate which is a partially or completely reflective flat plate arranged at the light-emitting side of the liquid crystal panel and changing the transparency of the liquid crystal panel so that the light once passed through the converging lens and the liquid crystal panel is reflected by the light-controlling plate and is returned to the light source and the ellipsoidal reflector and is then projected again onto the liquid crystal panel after passing through the converging lens, so that the amount and distribution of light beam projected on the liquid crystal panel may be easily controlled.

(5) With a means to control the reflectance, transmittance, and spectral distribution of the light-controlling plate, unevenness of light amount and color may be adjusted and improved more precisely.

What is claimed is

1. A lighting apparatus comprising:
   a light source,
   a reflector of partial ellipsoid having an inside reflecting surface, so arranged as to have the light source at the first focal point of ellipsoid and to have the light from the light source focused at the second focal point thereof,
   a reflector of partial sphere facing the reflector of ellipsoid with an aperture around the optical axis of the ellipsoid and having the center of the sphere at the light source,
   a converging lens arranged at the outside of the reflector of the partial sphere and having a focal point thereof at the second focal point of the reflector of ellipsoid, and
   a light-controlling plate, arranged at the further outside of the converging lens.

2. A lighting apparatus according to claim 1, wherein the light-controlling plate is a flat mirror having an opening around the axis of the ellipsoid.

3. A lighting apparatus according to claim 2, wherein the light-controlling plate is a flat plate being arranged at the back of a lighted object and being reflective at on outer area of said flat plate, and the lighted object is of controllable transmittance at the part corresponding to the reflective outer area of the light-controlling plate.

4. A lighting apparatus according to claim 1, wherein the light-controlling plate is a plate having spectrally selective transmittance and reflectance.

5. A lighting apparatus according to claim 4, wherein the light-controlling plate is a flat plate being arranged at the back of a lighted object and being reflective at an outer area of said flat plate, and the lighted object is of controllable transmittance at the part corresponding to the reflective outer area of the light-controling plate.

6. A lighting apparatus according to claim 1, wherein the light-controlling plate is a plate having transmittance and reflectance both changing along the radius direction from said axis.

7. A lighting apparatus according to claim 6, wherein the light-controlling plate is a flat plate being arranged at the back of a lighted object and being reflective at an outer area of said flate plate, and the lighted object is of controllable transmittance at the part corresponding to the reflective outer area of the light-controlling plate.

8. A lighting apparatus according to claim 6, wherein the transmittance and reflectance of the light-controlling plate is spectrally selective.

9. A lighting apparatus according to claim 8, wherein the light-controlling plate is a flat plate being arranged at the back of a lighted object and being reflective at an outer area of said flate plate, and the lighted object is of controllable transmittance at the part corresponding to the reflective outer area of the light-controlling plate.

10. A lighting apparatus according to claim 1, wherein the light-controlling plate is a flat plate being arranged at the back of a lighted object and being reflective at an outer area of said flat plate, and the lighted object is of controllable transmittance at the part corresponding to the reflective outer area of the light-controlling plate.

11. A lighting apparatus according to claim 10, wherein the object and the flat plate are made to one body.

12. A lighting apparatus according to claim 1, wherein the light-controlling plate has means to partially control the distribution of the transmittance and reflectance.

13. A lighting apparatus according to claim 1, wherein the light-controlling plate comprises a reflector, and a means to vary the transmittance thereof, and a means to control the means to vary the transmittance to control the transmittance distribution of the light-controlling plate.

14. A lighting apparatus according to claim 13, wherein the means to vary the transmittance is a liquid crystal panel.

* * * * *